United States Patent
Oh et al.

(10) Patent No.: US 8,117,470 B2
(45) Date of Patent: Feb. 14, 2012

(54) HOME NETWORK CLIENT AND SERVER INCLUDING ENERGY-AWAY CONTROL ELEMENT AND CONTROL METHOD THEREOF

(75) Inventors: Hyun-Woo Oh, DaeJeon (KR); In-Tark Han, DaeJeon (KR); Kwang-Rho Park, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 876 days.

(21) Appl. No.: 12/155,539

(22) Filed: Jun. 5, 2008

(65) Prior Publication Data
US 2009/0158064 A1      Jun. 18, 2009

(30) Foreign Application Priority Data
Dec. 12, 2007   (KR) .......................... 10-2007-129208

(51) Int. Cl.
G06F 1/00        (2006.01)
G06F 15/16       (2006.01)
G06F 15/173      (2006.01)
G06F 3/00        (2006.01)
G06F 13/00       (2006.01)

(52) U.S. Cl. ........ 713/310; 713/300; 709/208; 709/223; 710/5; 710/8; 710/15; 710/104

(58) Field of Classification Search .................. 713/300, 713/310; 709/208, 223; 710/5, 8, 15, 104
See application file for complete search history.

(56) References Cited

U.S. PATENT DOCUMENTS

| | | | |
|---|---|---|---|
| 7,260,730 B2* | 8/2007 | Sakaue | 713/310 |
| 2003/0225483 A1 | 12/2003 | Santinato et al. | |
| 2006/0005052 A1* | 1/2006 | Roe et al. | 713/300 |
| 2006/0155395 A1 | 7/2006 | Lim | |
| 2007/0124608 A1* | 5/2007 | Knowlson et al. | 713/300 |

FOREIGN PATENT DOCUMENTS

| | | |
|---|---|---|
| KR | 1020040005464 | 1/2004 |
| KR | 10-2006-0039335 | 5/2006 |
| KR | 10-2007-0062006 | 6/2007 |

OTHER PUBLICATIONS

Korean Office Action mailed May 24, 2010 in corresponding Korean Application No. 10-2007-0129208.

* cited by examiner

*Primary Examiner* — Stefan Stoynov
(74) *Attorney, Agent, or Firm* — Staas & Halsey LLP (57) ABSTRACT

Provided are a home network client and server including an energy-away control element (ECE), and a control method thereof. A client advertises an ECE serving as a functional block of each service unit. The advertisement is recognized and the ECE is registered by a plug and play method. An ECE to be controlled is searched and selected among registered ECEs. State checking and management are performed on the selected ECE. The ECE is defined by each service unit in the home network server and client, and energy is controlled for each ECE, so that the energy consumption can be reduced.

13 Claims, 7 Drawing Sheets

HOME NETWORK CLIENT AND SERVER INCLUDING ENERGY-AWAY CONTROL ELEMENT AND CONTROL METHOD THEREOF

CROSS-REFERENCE TO RELATED APPLICATIONS

This application claims priority under 35 U.S.C. §119 to Korean Patent Application No. P2007-129208, filed on Dec. 12, 2007, the disclosure of which is incorporated herein by reference in its entirety.

BACKGROUND OF THE INVENTION

1. Field of the Invention

The present disclosure relates to a home network client and server including an energy-away control element, and a control method thereof, and more particularly, to a home network client and server including an energy-away control element, and a control method thereof, which can save energy by defining and controlling an energy-away control element for each service unit in an individual server and client.

2. Description of the Related Art

Recently, the expansion of the Internet and the development of digital technologies are leading to active attempts and activities in the field of home networks for connecting a personal computer (PC), network equipment, audio-video (AV) equipment, domestic appliances and home automation equipment in the home.

Representatively, Universal Plug and Play (hereinafter, abbreviated to UPnP) is one of influential industrial specifications in the home network fields, which is promulgated by the UPnP forum consisting of many domestic and foreign vendors.

As a related art example associated with UPnP, a remote control system of a home network using UPnP has been described, which is characterized in that a remote access server includes a UPnP processing unit, a remote access service unit and a remote terminal service unit to process a web request/response between a UPnP home network where a plurality of UPnP devices are connected and a remote terminal for remotely controlling the UPnP home network. The UPnP processing unit serves as a control point for interaction with the plurality of UPnP devices, and controls a corresponding device among the plurality of UPnP devices in response to a service request. The remote access service unit adjusts remote access services to inform the UPnP processing unit of service requests from the plurality of remote terminals in a preset service order. For interaction with at least one of remote terminals, the remote terminal service unit converts a user web request from the remote terminal into a service request to transmit it to the remote access service unit, and transmits a service view, which is transmitted from the remote access service unit in response to the transmitted service request, to a corresponding remote terminal.

However, the related art remote control system of the home network uses a control point to search information of a client terminal required to provide service on a web base and to provide remote control thereof. The information of the client terminal may include a device list, a joined event list and a service request list.

That is, the related art remote control system of the home network controls just a function of the client terminal, without supporting energy consumption control. Particularly, energy control on each energy-consuming element within the terminal is not performed at all.

For this reason, even if an individual client operates other elements as well as one that is necessary for a desired service, there is no way to control this, and thus there is a disadvantage that unnecessary energy consumption may occur.

SUMMARY

Therefore, an object of the present invention is to provide a home network client and server including an energy-away control element (ECE) and a control method thereof, which can control energy by defining an ECE for each service unit in an individual server and a client and applying any one reference among a user policy method, a context-aware method and a service-based method.

Another object of the present invention is to provide a home network client and server including an energy-away control element (ECE) and a control method thereof, which can reduce energy consumption by defining an ECE for each service unit in a home network client and server and controlling the same.

To achieve these and other advantages and in accordance with the purpose(s) of the present invention as embodied and broadly described herein, a home network client in which energy consumption is controlled for each service unit in accordance with an aspect of the present invention includes: at least one energy-away control element (ECE) serving as a functional block of each service unit; an ECE driver serving as a driver of the ECE; a client protocol module for advertising the ECE for registration to a server and interpreting an ECE-associated command transmitted from the server; and a client manager for managing the ECE according to the command.

To achieve these and other advantages and in accordance with the purpose(s) of the present invention, a home network server that manages at least one client, and controls energy consumption of the client for each service unit in accordance with another aspect of the present invention includes: at least one energy-away control element (ECE) serving as a functional block of each service unit; an ECE driver serving as a driver of the ECE; a server protocol module for determining and controlling functions and energy states of an individual client and its ECE and providing a communication interface with the client; a server manager for managing an overall operation of the server; and a user interface for providing a user input/output interface for elements.

To achieve these and other advantages and in accordance with the purpose(s) of the present invention, a control method of a home network server and client including an energy-away control element (ECE) in accordance with another aspect of the present invention includes advertising, at a client, an ECE serving as a functional block of each service unit; recognizing the advertisement and registering the ECE by a plug and play method; searching and selecting an ECE to be controlled among registered ECEs; and performing state checking and management on the selected ECE.

To achieve these and other advantages and in accordance with the purpose(s) of the present invention, a control method of a home network server and client including an energy-away control element (ECE) in accordance with another aspect of the present invention includes: outputting a service initiation event according to user's setting; detecting the event and setting a register to display the service initiation; setting a register that controls an ECE serving as a functional block of each service unit; and controlling the ECE to provide a corresponding service.

To achieve these and other advantages and in accordance with the purpose(s) of the present invention, a control method of a home network server and client including an energy-away control element (ECE) in accordance with another aspect of the present invention includes: receiving, at a client, a message that indicates service initiation from a server; analyzing the message to learn details of a service; making predetermined setting in a register according to the details of the service; and controlling an ECE serving as an functional block of each service unit according to the predetermined setting to provide a service.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
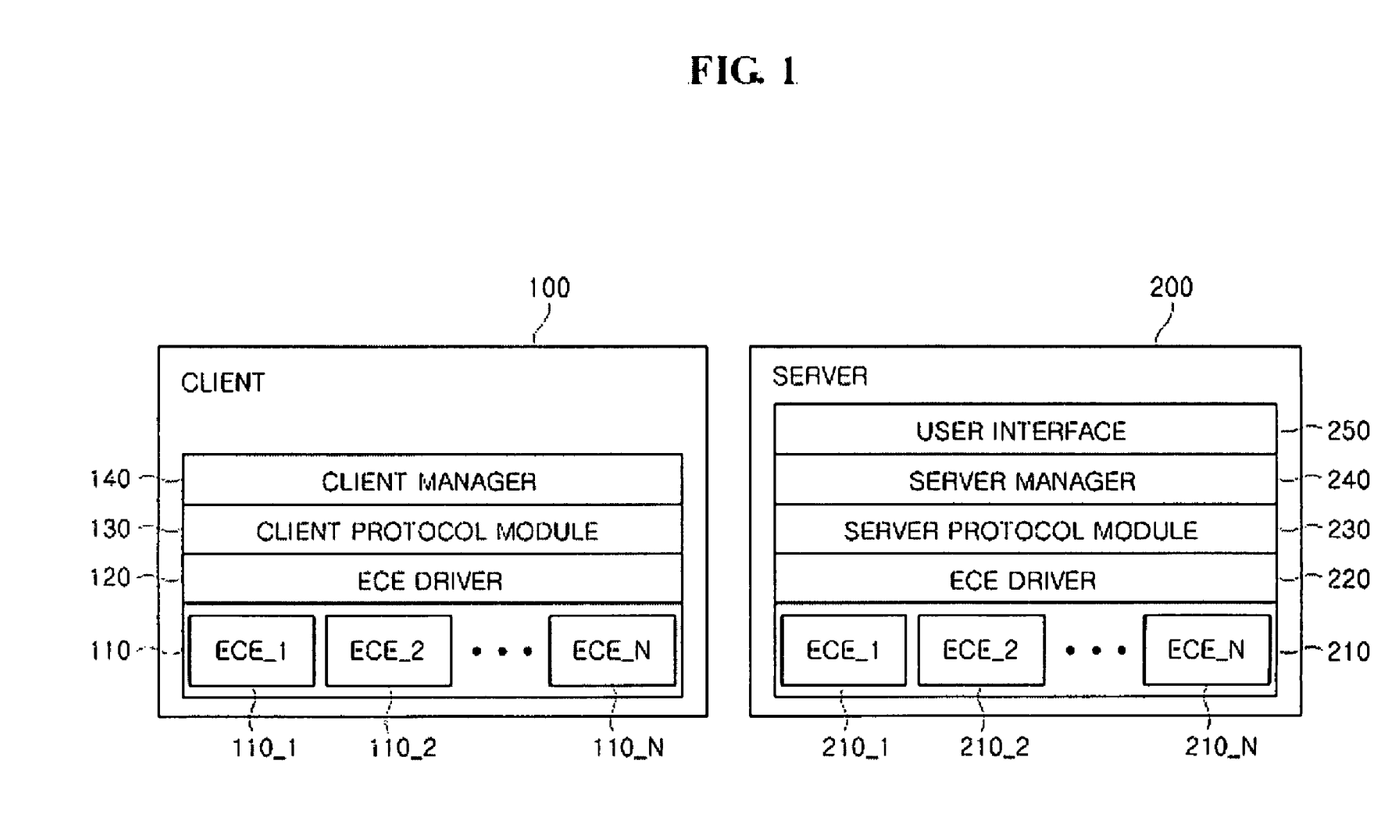
FIG. 1 is a block diagram of a home network client and server according to an embodiment of the present invention.

FIG. 1 is a block diagram of a home network client and a home network server according to an embodiment of the present invention. As shown in FIG. 1, the home network includes a server 200, managed by a provider, for providing comprehensive services, and a client 100, placed in a home, for providing actual services to a user under the management of the server 200.

In the home network client 100 and the home network server 200 according to the embodiment of the present invention, a functional block is defined for each service unit to define energy-away control elements (ECEs) 110 and 210, and an operation state and an energy state are monitored/controlled for each ECE, thereby reducing energy consumption.

The client 100 includes at least one energy-away control element 110, an ECE driver 120, a client protocol module 130 and a client manager 140. The at least one ECE 110 is a functional block of each service unit. The ECE driver 120 serves as a driver of the ECE 110. The client protocol module 130 advertises the ECE 110 and interprets a command associated with the ECE 110, which is transmitted from the server 200. The client manager 140 manages the ECE 110 according to the command.

The ECE 110 is a functional block divided for each service unit, which is included in the client 100.

For example, the ECEs 110 may include an Ethernet module for providing Internet services, and a main memory and a main processor for supporting a basic system operation.

The ECE driver 120, which is a driver of each ECE 110, converts a command for driving the ECE 110 transmitted by the client manager 140 into a format interpretable by each ECE 110, and transmits to each ECE 110.

The client protocol module 130 performs advertising such that the server 200 can acquire information of the ECE 110, and interprets a command transmitted from the server 200 to thereby transmit it to the client manager 140. The command may be associated with, e.g., ECE search, ECE state check or an operation-state change of the ECE 110.

The client manager 140 manages the ECE 110 included in the individual client 110 according to the command interpreted by the client protocol module 130.

The server 200 controls searching, functions and energy consumption of at least one client 100 within the home network and its functional block.

The server 200 includes at least one ECE 210 for serving as a functional block of each service unit, an ECE driver 220 for serving gas a driver of the ECE 210, a server protocol module 230 for providing a communication interface with the client 100 in order to monitor/control functions and energy states of the individual client 100 and its ECE 110, a server manager 240 for controlling the ECE 210 and a user interface 250 for providing a user input/output (I/O) interface for elements.

The ECE 210 is a functional block divided by each service unit, which is included in the server 200.

The ECE driver 220 is a driver of each ECE 210, and converts a command for driving the ECE 210 transmitted from the sever management manager 240 into a format interpretable by each ECE 210, thereby controlling each ECE 210.

The server protocol module 230 interprets a command for controlling functions and energy states of the individual client 100 and its ECE 110, and provides an interface for communication with the client 100.

The server manager 240 serves to manage overall operations of the server 200.

The user interface 250 provides an I/O interface to receive a user's command for controlling each of elements, and displays a result of the input command to a user.

At this time, in the aspect of automatically registering, monitoring and controlling the added ECEs 110 and 210, a protocol used by the server protocol module 230 and the client protocol module 130 is called an energy-away plug and play protocol.

Figure 2:
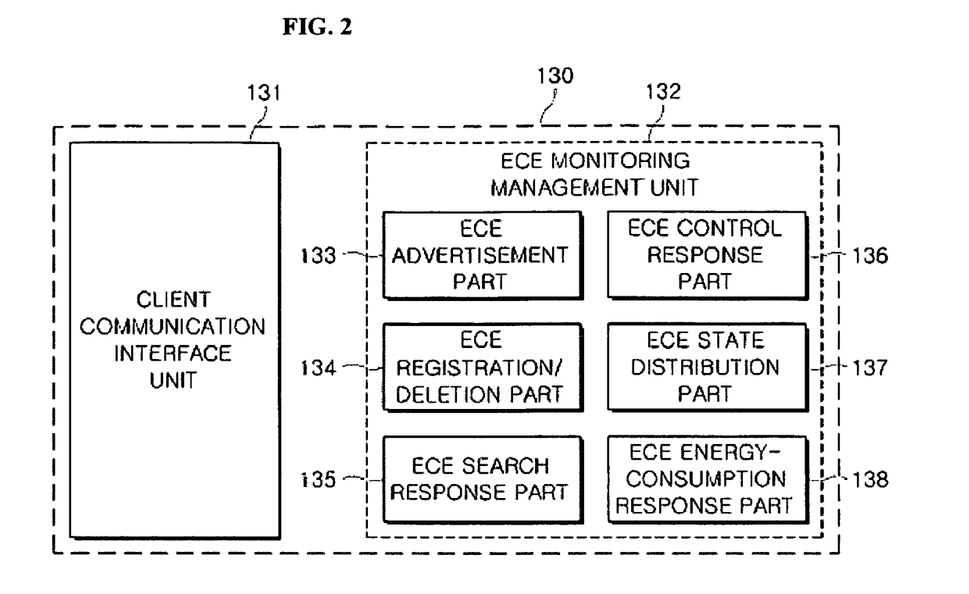
FIG. 2 is a block diagram of a client protocol module according to an embodiment of the present invention.

FIG. 2 is a block diagram of the client protocol module 130 according to an embodiment of the present invention. Referring to FIG. 2, the client protocol module 130 includes a client communication interface unit 131 and an ECE monitoring management unit 132. The client communication interface unit 131 provides a communication interface with the server 200. The ECE monitoring management unit 132 advertises the ECE 110, requests registration/deletion of the ECE 110 and responds to a request for searching, controlling, state monitoring or energy consumption monitoring from the server 200.

The client communication interface unit 131 provides a communication interface with the server 200 connected over the network.

The ECE monitoring management unit 132 includes an ECE advertisement part 133 for transmitting information of an ECE 110 to the server 200, an ECE registration/deletion part 134 for requesting registration or deletion of the ECE 110 from the server 200, an ECE search response part 135 for providing a response to a request for ECE search, an ECE control response part 136 for transmitting a result of ECE control, an ECE state distribution part 137 for reporting an operation state of the ECE 110, and an ECE energy consumption response part 138 for providing a response to a request for energy-consumption information.

That is, when the client 100 is added to the network, the client 100 advertises its ECE 110 through the ECE advertisement part 133. Then, the server 200 receives the advertisement, registers the ECE 110 included in the corresponding client 100, and provides an I/O interface of monitoring and state changes thereof through the user interface 250 of the server 200.

The client 100 may further include an operating system (OS) supporter (not shown) for providing an OS of the individual client 100, an internal register (not shown) for storing information associated with an operation state of the ECE 110, an internal control register (not shown) for providing predetermined setting for controlling the ECE 110, a field programmable gate array (FPGA) (not shown) for learning details of a service from a message transmitted from the server 200, and a service applicator (not shown) for supporting the learned service.

The OS supporter (not shown) provides an OS software environment of the individual client 100.

The internal register (not shown) may set a value of a predetermined rule to display an operation state of each ECE 110.

For example, when ECE A is changed from an active state into a sleep state, internal register A changes its value from 1 to 0 so as to indicate that the operation state of the ECE A has changed.

The internal control register (not sown) may set a value of a predetermined rule to control functions, operation state and energy consumption of the individual ECE 110.

For example, internal control register B changes its value from 1 to 0, thereby operating a specific function of ECE B, or changing an operation state or a power consumption extent thereof.

The FPGA (not shown) interprets a message for service indication, which is transmitted from the server 200, to learn details of the service.

The service applicator (not shown) indicates initiation of the service corresponding to the message, and changes an operation state of an ECE 110 in a non-operation state.

According to the present invention, the energy consumption can be reduced by controlling both a function corresponding to a service and an energy state of the ECE 110 used to provide the service.

Figure 3:
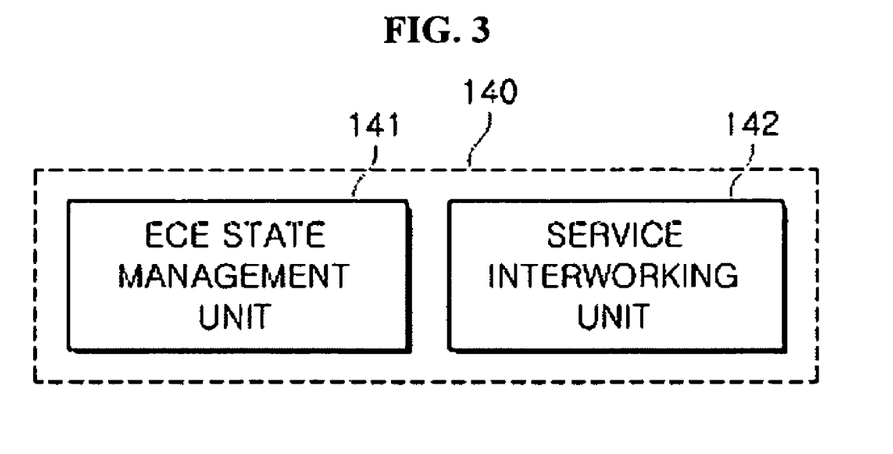
FIG. 3 is a block diagram of a client manager according to an embodiment of the present invention.

FIG. 3 is a block diagram of the client manager 140 according to an embodiment of the present invention. As shown in FIG. 3, the client manager 140 includes an ECE state management unit 141 for managing an operation state of the ECE 110, and a service interworking unit 142 for supporting a corresponding service when an operation state changes.

The ECE state management unit 141 sets a predetermined value in the internal register when a state change occurs in each ECE 110.

The ECE state management unit 141 monitors the value of the internal register by a user request method, a user policy method, a context-aware method or a service-based method, and thus provides a user with state information of the individual ECE 110.

The service interworking unit 142 delivers a service initiation message transmitted from the service applicator (not shown) to the client manager 140 to cause the client manager 140 to control the ECE 110, thereby supporting the corresponding service.

The service interworking unit 142 delivers the service initiation message to the client manager 140 through the client protocol module 130.

The service initiation message transmitted from the service applicator (not shown) is transmitted to the client manager 140 through the client protocol module 130 so that the client manager 10 controls an energy state of the ECE 110 for supporting the corresponding service.

Figure 4:
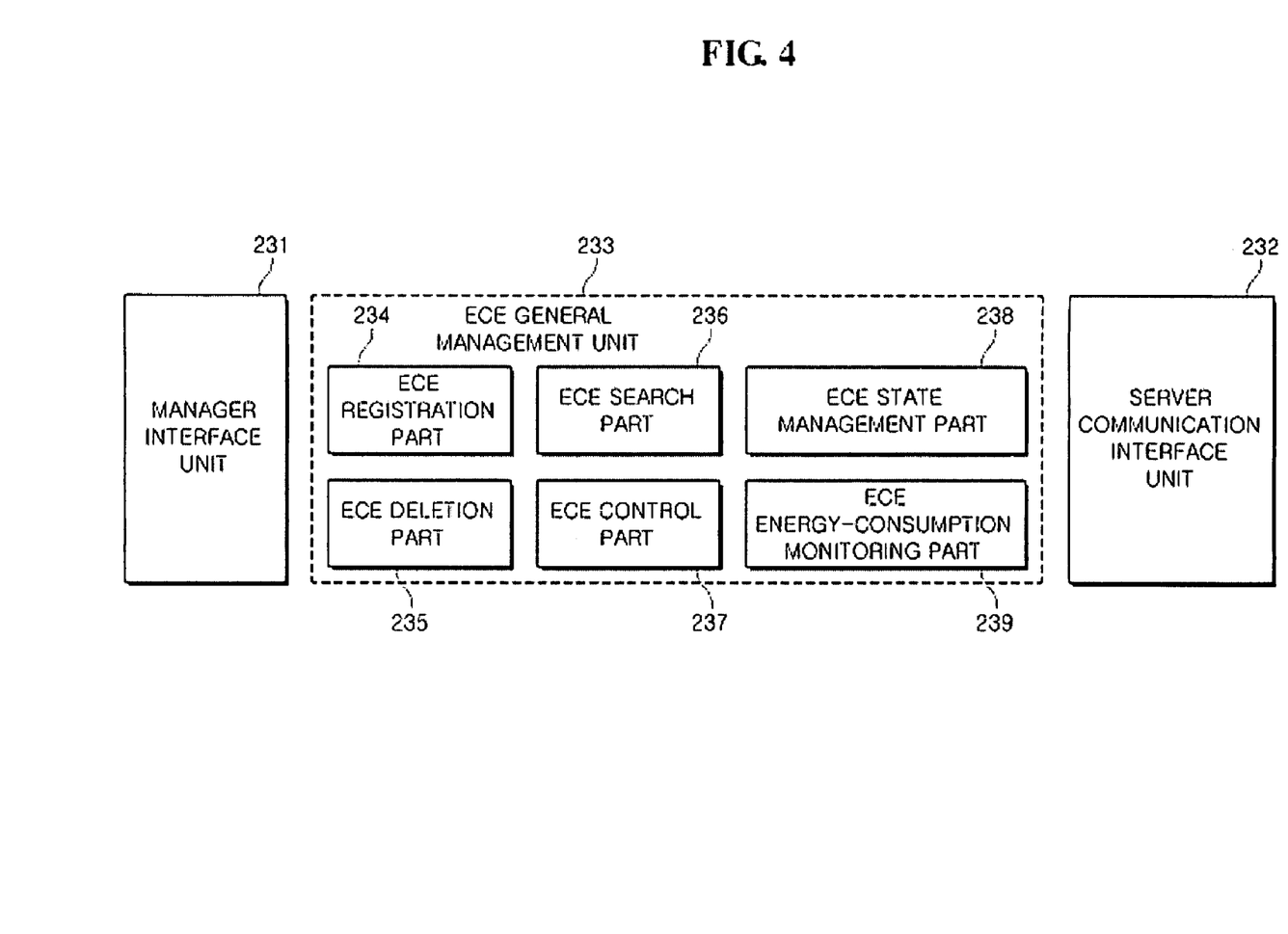
FIG. 4 is a block diagram of a server protocol module according to an embodiment of the present invention.

FIG. 4 is a block diagram of the server protocol module 230 according to an embodiment of the present invention. As shown in FIG. 4, the server protocol module 230 includes a manager interface unit 231, an ECE general management unit 233 and a server communication interface unit 232. The manager interface unit 231 provides an interface with the server manager 240. The ECE general management unit 233 controls registration, deletion, search and energy consumption of the ECE 110 of the client 100 and the ECE 210 of the server 200. The server communication interface unit 232 provides a communication interface with the server.

The manager interface unit 231 provides an interface between the server protocol module 230 and the server manager 240.

The ECE general management unit 233 includes an ECE registration part 234 for recognizing an ECE 110 of the client 100 and an ECE 210 of the server 200 to cause the server manager 240 to register information of the ECEs 110 and 210, an ECE deletion part 235 for deleting the registered information of the ECEs 110 and 210, an ECE search part 236 for searching for ECEs 110 and 210 necessary for a service, an ECE control part 237 for controlling energy states of the ECEs 110 and 210 necessary for the service, an ECE state management part 238 for setting in a register, operation states of the ECEs 110 and 210 necessary for the service and monitoring the operation states, and an ECE energy consumption monitoring part 239 for monitoring energy-state changes of the ECEs 110 and 210.

When a client 100 is added to the energy-away plug and pay network, the ECE registration part 234 causes the server manager 240 to register information of a client type, function information of the ECE 110 and information of an available service.

The ECE deletion part 235 causes the service manager 240 to delete the registered information of the ECE 210 and associated information.

The ECE search part 236 searches for ECEs 110 and 210 necessary for a service.

The ECE control part 237 controls energy states of the ECEs 110 and 210 necessary for the service through the ECE driver 220.

The ECE state management part 238 monitors operation states of the ECEs 110 and 210 necessary for the service.

The monitoring of the operation state may be performed by observing a change of a set value in the internal register (not shown).

The ECE energy consumption monitoring part 239 monitors a change of the energy consumption of the ECEs 110 and 210.

The service communication interface 232 provides a communication interface with the client 100 connected to the network of various interfaces.

The above-described operations may be performed according to user's setting or a context-aware method.

Figure 5:
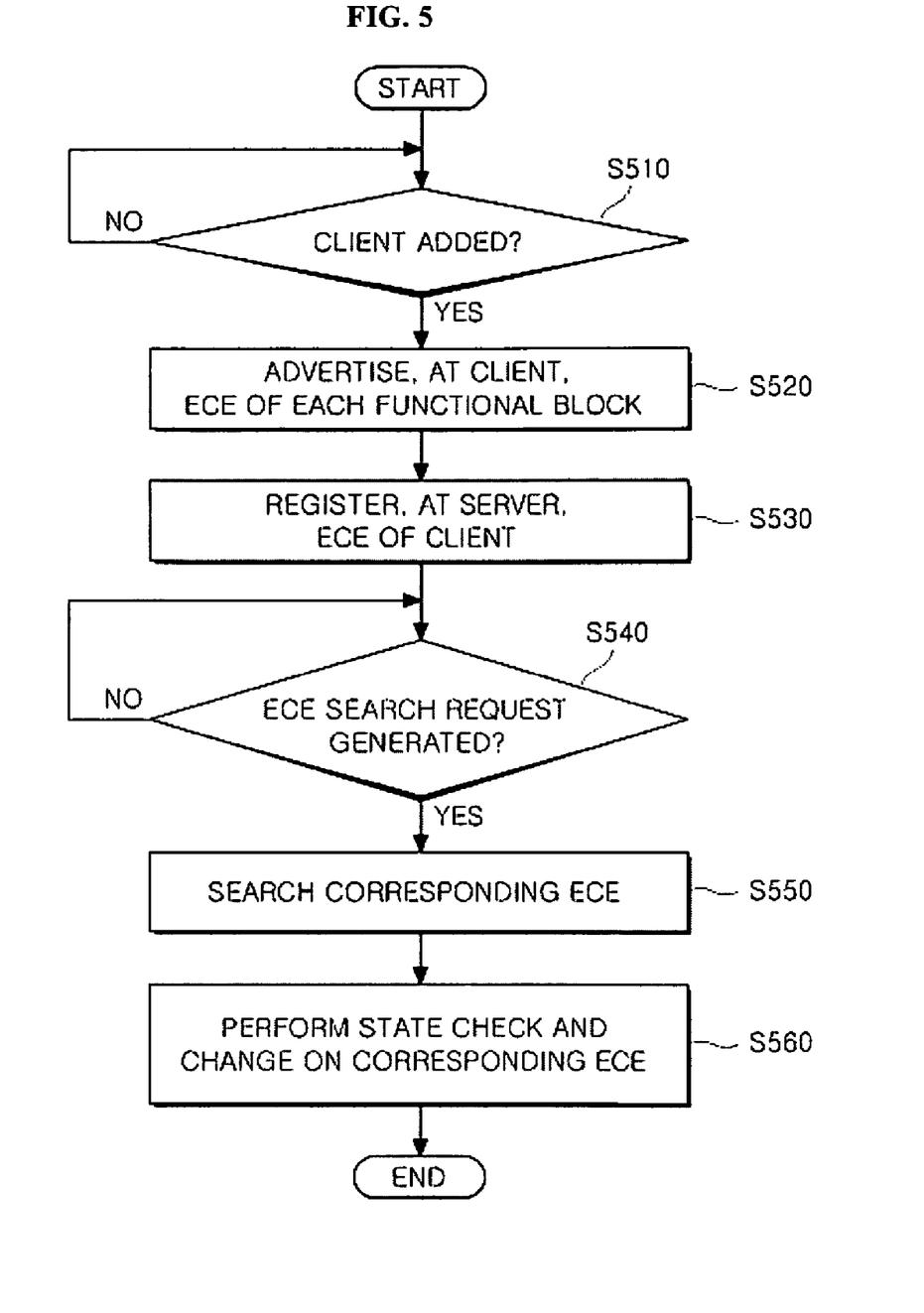
FIG. 5 is a flowchart of a control method of a home network server and client including an energy-away control element (ECE) according to an embodiment of the present invention.

FIG. 5 is a flowchart of a control method of a home network client 100 and server 200 including an ECE according to an embodiment of the present invention. Description will now be made with reference to FIG. 5.

If a new client 100 is added to a home network in operation S510, the client 100 sends a message that advertises an ECE 110 of the client 100 in operation S520.

The server 200 receives this advertisement message of the client 100 and registers the corresponding ECE in operation S530.

If a search request is generated from a user in operation S540, the server 200 searches registered ECEs 110 and 210 to thereby select at least one ECE intended to control in operation S550.

In detail, when a home network user inputs the search conditions of ECEs 110 and 210 intended to control through the user interface 255, the server 200 searches for corresponding ECEs 110 and 210 by referencing the input condition, and displays the search result through the user interface 250.

In operation S560, the server 200 may perform various control and management, such as state checking and changing of the selected ECE.

In detail, the server 200 controls the corresponding ECEs 110 and 210 according to a control command for the ECEs 110 and 210, which is input through the user interface 250, and displays a result thereof through the user interface 250.

For example, the server 200 transmits a command indicating a state change to the ECEs 110 and 210 and transmits a command for monitoring an operation state of the ECEs 110 and 210.

Alternatively, the server 200 requests energy-consumption information of the ECEs 110 and 210, and deletes information of the registered ECEs 110 and 210.

Figure 6:
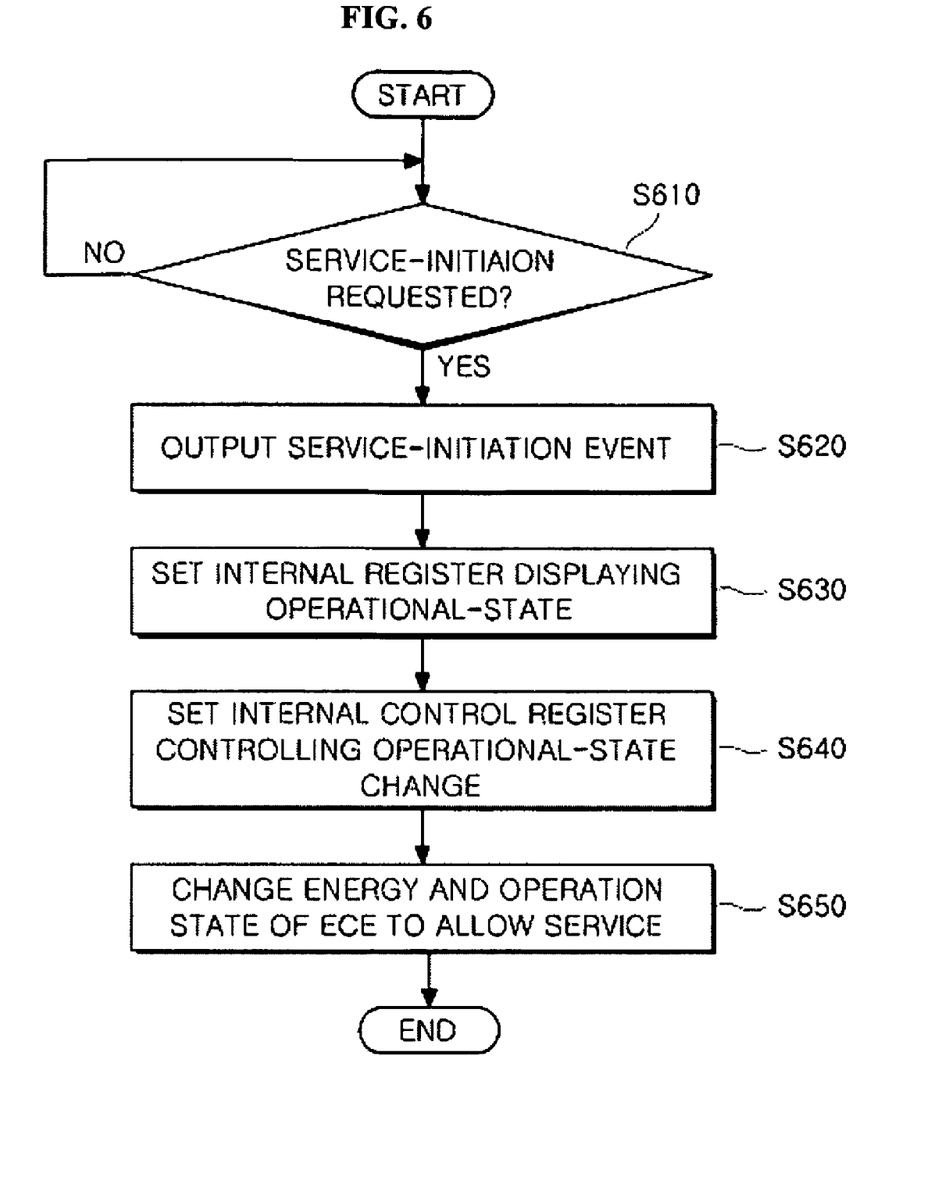
FIG. 6 is a flowchart illustrating an order of providing an origination service of a home network client including an ECE according to an embodiment of the present invention.
Figure 7:
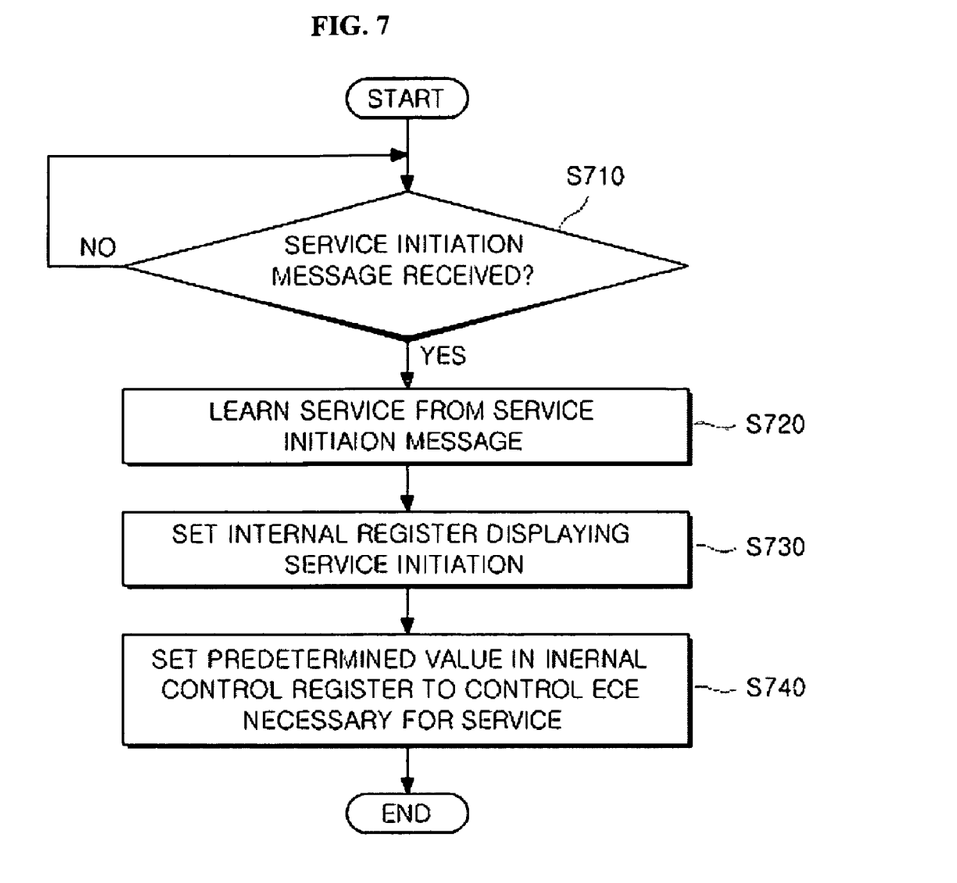
FIG. 7 is a flowchart illustrating an order of providing a termination service of a home network client including an ECE according to an embodiment of the present invention.

As shown in FIGS. 6 and 7, state monitoring of the ECE may be performed as the client 100 informs the server 200.

FIG. 6 is a flowchart illustrating an order of providing an origination service of a home network client 100 including an ECE according to an embodiment of the present invention. Procedures of controlling the ECE and reporting a state thereof will now be described with reference to FIG. 6 according to an embodiment of the present invention.

If the client 100 receives user's input that requests service initiation in operation S610, the client 100 generates and outputs a service initiation event in operation S620.

The service initiation event may be generated by a user policy method, a context-aware method or a service-based method, besides the user's request.

In operation S630, the client 100 detects the service initiation event to set an internal register (not shown) with respect to an operation state.

In operation S640, the client 100 sets an internal control register (not shown) for controlling an ECE 110 of each functional block.

In operation S650, the energy and operation states of the corresponding ECE 110 is changed from a sleep mode to an operation mode according to the setting of the internal control register (not shown), so that the corresponding service can be provided.

Thereafter, the client 100 transmits the changed state of the corresponding ECE 110 through the ECE state distribution part 137, and requests an update from the server 200.

FIG. 7 is a flowchart illustrating an order of providing a termination service of the home network client 100 including an ECE according to an embodiment of the present invention. Description will now be made with reference to FIG. 7.

In operation S710, the client 100 receives a message indicating service initiation from the server 200 or another request device.

The server 200 may indicate the service initiation under a request of a user of the server 200 through the user interface 250, or a request of a user of another client 100.

The message indicating the service initiation from the server 200 or another request device may be provided as packets transmitted to a unique address of the client 100.

In operation S720, the client 100 analyzes the message indicating the service initiation to learn details of the service.

In operation S730, the client 100 makes predetermined setting that reports the service initiation in an internal register (not shown) for displaying an operation state, and uses the predetermined setting in operational-state monitoring.

In operation S740, the client 100 makes predetermined setting in an internal control register (not shown) to control an ECE 110 of a functional block necessary for the corresponding service, and then initiates the corresponding service.

Even in this case, the client 100 transmits the changed state of the corresponding ECE 110 through the ECE state distribution part 137 and requests an update from the server.

The home network client and server including an ECE and a control method thereof according to the embodiments of the present invention define ECEs for each service unit in the server and client and perform monitoring/control of the energy state of each ECE, so that energy consumption of a home network system can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims. For example, it has been described that the server protocol module 230 performs functions of registration/deletion and monitoring/control of the ECE 110 of an individual client, as well as a communication interface. However, the present invention is not limited thereto, and the server manager 240 may be configured to perform a portion or all of those functions.

What is claimed is:

1. A home network client in which energy consumption is controlled for each service unit, the client comprising:
   at least one energy-away control element (ECE) serving as a functional block of each service unit;
   an ECE driver serving as a driver of the ECE;
   a client protocol module for advertising the ECE for deletion to a server and interpreting an ECE-associated command transmitted from the server; and
   a client manager for managing the ECE according to the command,
   wherein the client protocol module comprises:
      a client communication interface unit for providing a communication interface with the server; and
      an ECE monitoring management unit for advertising the ECE, requesting deletion of the ECE and responding to a request for control and state information of the ECE.

2. A home network client in which energy consumption is controlled for each service unit, the client comprising:
  at least one energy-away control element (ECE) serving as a functional block of each service unit;
  an ECE driver serving as a driver of the ECE;
  a client protocol module for advertising the ECE for registration to a server and interpreting an ECE-associated command transmitted from the server; and
  a client manager for managing the ECE according to the command,
  wherein the client protocol module comprises:
  a client communication interface unit for providing a communication interface with the server; and
  an ECE monitoring management unit for advertising the ECE, requesting registration/deletion of the ECE and responding to a request for control and state information of the ECE,
  wherein the ECE monitoring management unit comprises:
  an ECE advertising part for transmitting information of the ECE;
  an ECE registration/deletion part for requesting registration or deletion of the ECE;
  an ECE search response part for providing a response to a request for ECE search;
  an ECE control response part for transmitting a result of ECE control;
  an ECE state distribution part for reporting an operation state of the ECE; and
  an ECE energy-consumption response part for providing a response to a request for energy consumption information.

3. A home network client in which energy consumption is controlled for each service unit, the client comprising:
  at least one energy-away control element (ECE) serving as a functional block of each service unit;
  an ECE driver serving as a driver of the ECE;
  a client protocol module for advertising the ECE for registration to a server and interpreting an ECE-associated command transmitted from the server; and
  a client manager for managing the ECE according to the command,
  wherein the client manager comprises:
  a service interworking unit for reporting initiation of a corresponding service; and
  an ECE state management unit for managing an operation state of the ECE according to the service.

4. A home network client in which energy consumption is controlled for each service unit, the client comprising:
  at least one energy-away control element (ECE) serving as a functional block of each service unit;
  an ECE driver serving as a driver of the ECE;
  a client protocol module for advertising the ECE for registration to a server and interpreting an ECE-associated command transmitted from the server;
  a client manager for managing the ECE according to the command,
  an operating system supporter for providing an operating system of the client;
  an internal register for storing information associated with an operation state of the ECE;
  an internal control register for making predetermined setting for controlling the ECE; and
  a field programmable gate array (FPGA) for learning details of a service from a message that indicates the service.

5. A home network server that manages at least one client, and controls energy consumption of the client for each service unit, the server comprising:
  at least one energy-away control element (ECE) serving as a functional block of each service unit;
  an ECE driver serving as a driver of the ECE;
  a client protocol module for advertising the ECE for deletion to a server and interpreting an ECE-associated command transmitted from the server;
  a server protocol module for determining and controlling functions and energy states of an individual client and its ECE and providing a communication interface with the client;
  a server manager for managing an overall operation of the server; and
  a user interface for providing a user input/output interface for elements.

6. A home network server that manages at least one client, and controls energy consumption of the client for each service unit, the server comprising:
  at least one energy-away control element (ECE) serving as a functional block of each service unit;
  an ECE driver serving as a driver of the ECE;
  a server protocol module for determining and controlling functions and energy states of an individual client and its ECE and providing a communication interface with the client;
  a server manager for managing an overall operation of the server; and
  a user interface for providing a user input/output interface for elements,
  wherein the server protocol module comprises:
  a manager interface unit for providing an interface with the server manager;
  an ECE general management unit for controlling an overall operation of the ECE; and
  a server communication interface unit for providing a communication interface with the client.

7. The server of claim 6, wherein the ECE general management unit comprises:
  an ECE registration part for recognizing the ECE to cause the server manager to register information of the ECE;
  an ECE deletion part for causing the server manager to delete the registered ECE information;
  an ECE search part for searching for an ECE necessary for service;
  an ECE control part for controlling an energy state of the ECE necessary for the service;
  an ECE state management part for managing an operation state of the ECE necessary for the service; and
  an ECE energy-consumption monitoring part for monitoring an energy-state change of the ECE.

8. A control method of a home network server and client including an energy-away control element (ECE), the method comprising:
  advertising, at a client, an ECE serving as a functional block of each service unit;
  recognizing the advertisement and registering the ECE by a plug and play method;
  searching and selecting an ECE to be controlled among registered ECEs; and
  performing state checking and management on the selected ECE,
  wherein the searching and selecting of the ECE comprises:
  receiving a request search for searching the ECE to be controlled from a user; and displaying the search result of the ECE to be controlled allowing the user to select an ECE to control.

9. The method of claim 8, wherein the performing of the state checking and management comprises:
receiving a control command for the ECE; and
controlling the ECE according to the control command and displaying the control result.

10. The control method of claim 8, wherein the state checking and management are performed according to a user's request, a preset user policy or a context-aware method.

11. A control method of a home network server and client including an energy-away control element (ECE), the method comprising:
advertising, at a client, an ECE serving as a functional block of each service unit;
recognizing the advertisement and registering the ECE by a plug and play method;
searching and selecting an ECE to be controlled among registered ECEs; and
performing state checking and management on the selected ECE,
wherein the performing of the state checking and management comprises:
receiving a control command for the ECE; and
controlling the ECE according to the control command and displaying the control result,
wherein the displaying of the control result comprises:
transmitting a command that indicates an operation state change of the ECE and displaying a result thereof, if the control command indicates a state change;
transmitting a command that monitors an operation state of the ECE and displaying a result thereof, if the control command indicates a state check;
requesting information of energy consumption of the ECE and displaying a result thereof, if the control command is an energy-consumption request; and
deleting information of a corresponding registered ECE information and displaying a result thereof, if the control command is an information deletion request.

12. A control method of a home network server and client including an energy-away control element (ECE), the method comprising:
receiving, at a client, a message that indicates service initiation from a server;
analyzing the message to learn details of a service;
making predetermined setting in a register according to the details of the service; and
controlling an ECE serving as an functional block of each service unit according to the predetermined setting to provide the service comprising:
reporting initiation of the service; and
managing an operation state of the ECE according to the service.

13. The method of claim 12, wherein the message is transmitted as packets to a unique address of the client.

\* \* \* \* \*